March 17, 1953 A. S. KESTER ET AL 2,632,056

BUSY SIGNAL FOR INTERCOMMUNICATING TELEPHONE SYSTEMS

Filed Dec. 30, 1947 3 Sheets-Sheet 1

INVENTORS.
ARTHUR S. KESTER
BERNARD S. CAHILL
BY Paul Kolisch
ATTORNEY.

INVENTORS.
ARTHUR S. KESTER
BERNARD S. CAHILL
BY
ATTORNEY.

BUSY SIGNAL FOR INTERCOMMUNICATING TELEPHONE SYSTEMS

Filed Dec. 30, 1947

INVENTORS.
ARTHUR S. KESTER
BERNARD S. CAHILL
BY [signature]
ATTORNEY.

Patented Mar. 17, 1953 2,632,056

UNITED STATES PATENT OFFICE 2,632,056

BUSY SIGNAL FOR INTERCOMMUNICATING TELEPHONE SYSTEMS

Arthur S. Kester and Bernard S. Cahill, Chicago, Ill., assignors to The Rauland Corporation, Chicago, Ill., a corporation of Illinois Application December 30, 1947, Serial No. 794,640

8 Claims. (Cl. 179—1)

This invention relates to new and useful improvements in busy signals for intercommunication systems.

The object of the present invention is to provide a signal, e. g. a small gas discharge lamp, at a calling station to indicate the busy condition of a called station, the arrangement being so simple that the signal can be added to existing intercommunicating installations without extensive alterations.

With this object in view we connect a lamp, such as a neon filled lamp, with the primary winding of the output transformer customarily provided in the amplifier at each station. Whenever a first station calls a second station which happens to be busy with a third station, the lamp at the first station will be lighted whenever the third station is talking to the second station, power being supplied by the amplifier at the third station.

Figure 1:
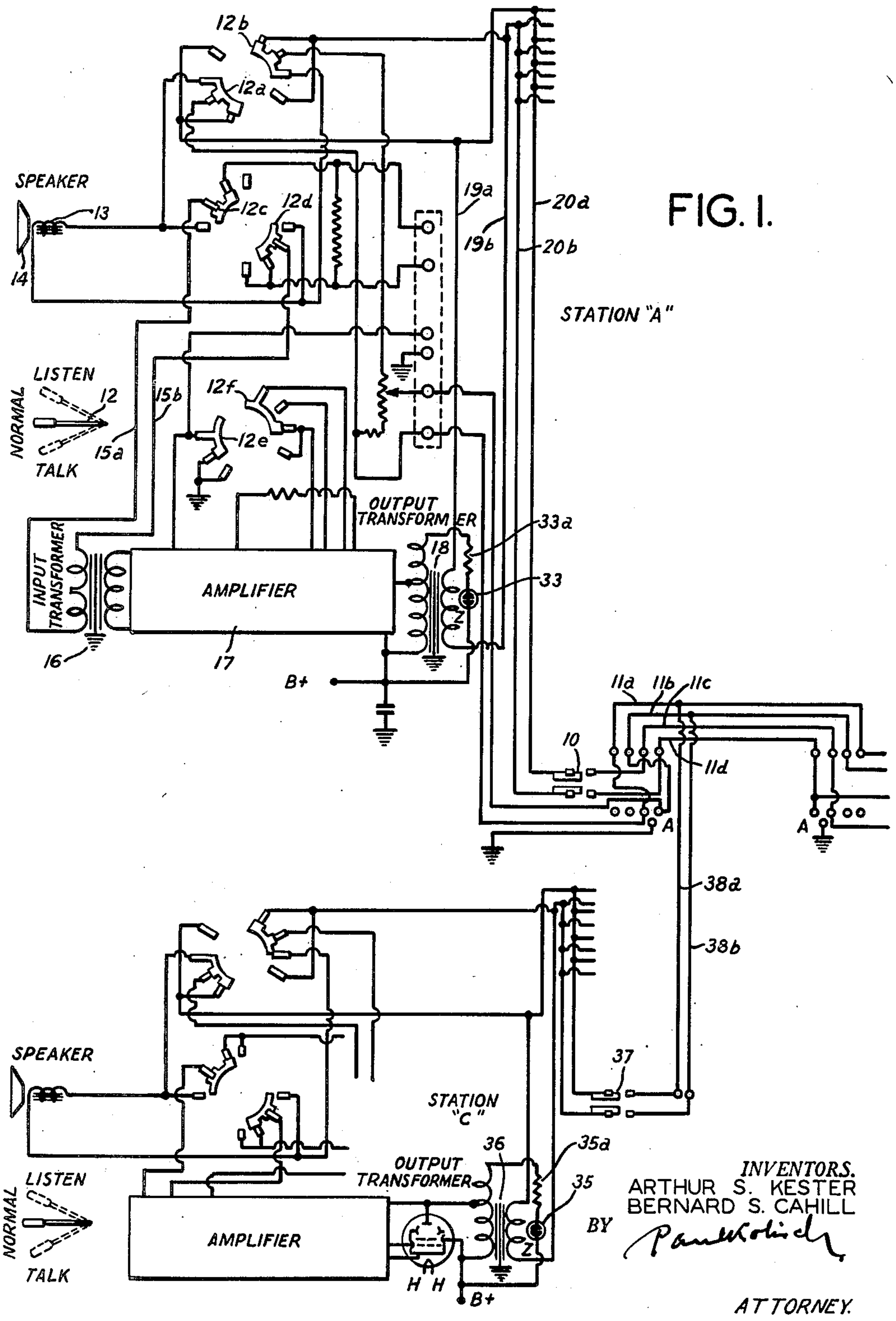
Figure 2:
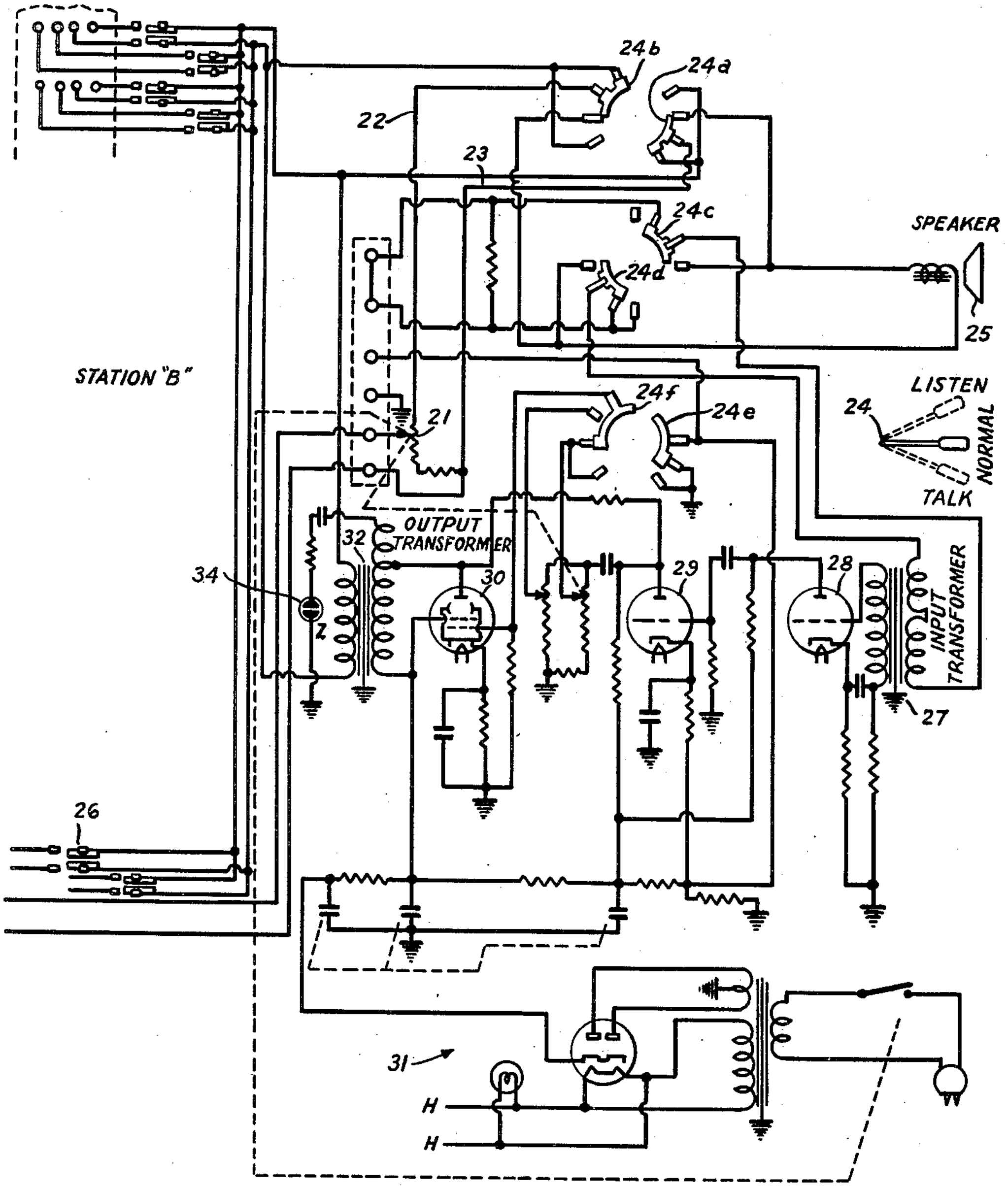
Figure 3:
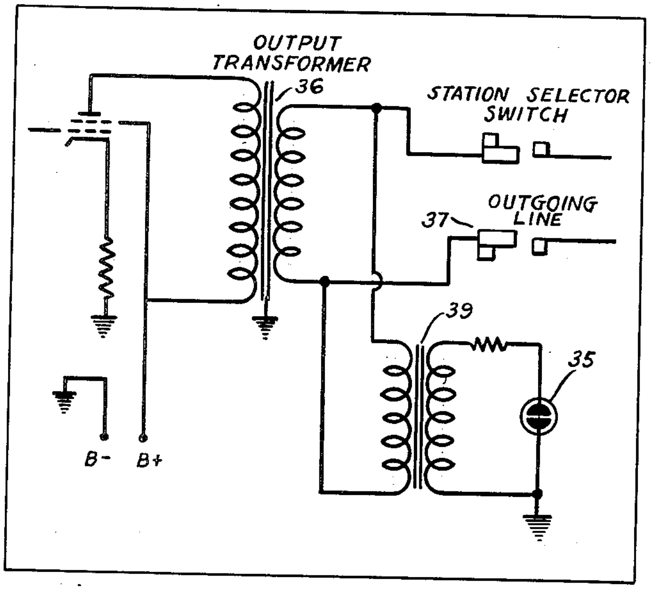
Figure 4:
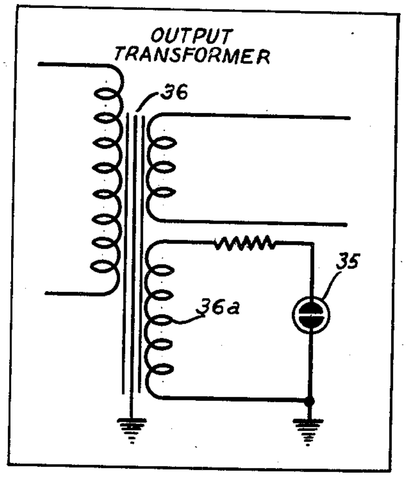
Figure 5:
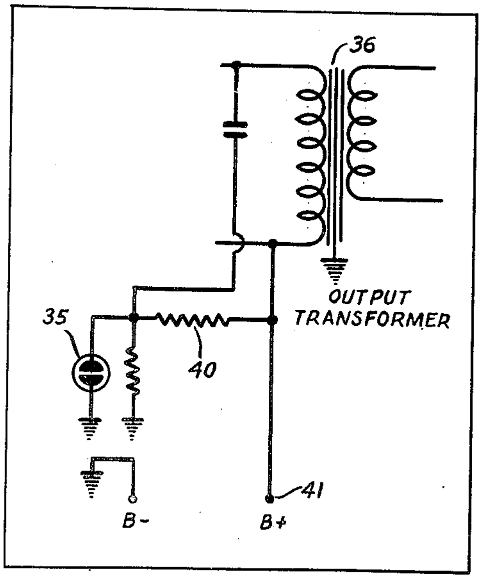

The invention will be more clearly understood from the following detailed description of a few embodiments thereof with reference to the drawings, in which:

Figs. 1 and 2, when placed side by side, diagrammatically illustrate three stations of an intercommunicating system, only so much being shown of the circuits and the apparatus as is necessary for an understanding of the nature of the invention;

Figs. 3, 4 and 5 are circuit diagrams of three modifications of the invention illustrated in Figs. 1 and 2.

The three stations A, B and C are alike in every respect except for the wiring of the station selector switches. Fig. 2 shows the circuit of station B in greater detail than Fig. 1, but stations A and C are, as above stated, like station B. The system may, of course, comprise stations differing from the ones illustrated, e. g. not every station need be provided with an amplifier.

Let us assume that station A wishes to talk with station B. Station A will close station selector switch 10 by means of which station B may be connected with line 11c—d individual to station A. Each station A, B, C is equipped with one station selector switch for each other station of the system. A talk-listen switch 12 at station A has six quadrants 12a–f cooperating with six groups of terminals.

Having operated the switch 10, the operator at the station A moves the talk-listen switch into the talk position, thus rotating the quadrants 12a to 12f in a counterclockwise direction to connect the magnet 13 of loudspeaker 14 over quadrants 12c and 12d with conductors 15a, 15b leading to the primary winding of input transformer 16 associated with an amplifier 17 provided at station A. The details of the amplifier are shown at station B in Fig. 2. The output of the loudspeaker 14 will be amplified at 17 and fed over an output transformer 18 to conductors 19a, 19b connected with the secondary winding of the output transformer 18. These two conductors are in turn connected over conductors 20a and 20b with the two contacts of the station selector switch 10 and therethrough over the line conductors 11c and 11d to station B, potentiometer 21, conductors 22 and 23, quadrants 24a and 24b of talk-listen switch 24, to the loudspeaker 25. Thus the called station will hear the calling station announcing itself and also giving its number. The operator at the called station B will now actuate the calling station selector switch 26.

The two stations can now converse. When the operator at station A wishes to talk he moves the talk-listen switch 12 into the talk or lower position in which the loudspeaker 14 is connected with the primary of the input transformer of amplifier 17 and the secondary of output transformer 18 is connected with the line conductors 11c and 11d. When the talk-listen switch 24 of the called station is either in the normal or in the listen position then the loudspeaker 25 of this station is connected by the talk-listen switch 24 with the line conductors 11c and 11d. The loudspeaker 25 at the called station is fed with amplified currents from the amplifier 17 at the calling station.

If the station B wishes to talk to station A then switch 24 at station B is moved into the talk position and switch 12 at station A into the normal or listening position. In this position loudspeaker 25 of station B will be connected with the primary winding of input transformer 27 of the amplifier at station B. Speech output is amplified by means of a triode 28, a second triode 29, and a pentode 30, power being supplied from a supply circuit 31. The output of pentode 30 is fed to the primary of an output transformer 32 and through the secondary thereof and contacts of the station selector switch 26 to the line conductors 11a and 11b and thence over the quadrants 12a and 12b of the talk-listen switch 12 at station A to the loudspeaker 14. Thus the amplified output of the loudspeaker 25 will be fed to the loudspeaker 14 at station A.

A busy signalling device in the form of a neon discharge lamp 33 is bridged across the rpimary winding of the output transformer 18 at station A over a current limiting resistor 33a which should have a value of resistance high enough to prevent the neon lamp circuit from overloading the amplifier output, for example 2 megohms, but not so high as to rapidly quench the lamp. Similarly, a neon discharge lamp 34 is bridged across the primary of output transformer 32 at station B, and a neon discharge lamp 35 is bridged across the primary of output transformer 36 at station C. While the operator at a station is talking, the associated neon lamp will be flashing in synchronism with the speech indicating that speech is going out over the line. However, this will not affect the indicating lamp at the station with which conversation is maintained.

Should the operator at station C establish a connection with station A by actuating switch 37 provided at station C for selecting the station A, then the lamp 35 provided thereat will be flashed by the output of the amplifier at station B while the latter is talking. This output will be fed through the secondary of the output transformer 32 and thence over the contacts of the switch 26, over conductors 11*a* and 11*b*, conductors 38*a* and 38*b*, and switch 37 to the secondary winding of the output transformer 36 at the station C. The lamp 35 which is bridged across the primary of transformer 36 will flash and indicate the busy condition of the called station. The output of the transformer 18 at the station A will not actuate the lamp 35 since it is connected with the conductors 11*c* and 11*d*.

As shown in Fig. 3, the lamp 35 at station C may be connected through a step-up transformer 39, across the secondary winding of the output transformer 36 and thus with the contacts of the switch 37 or any other station selector switch at station C.

In the arrangement illustrated in Fig. 4 the lamp 35 at the station C is connected with one of two secondary windings 36*a* of the output transformer 36.

In the arrangement shown in Fig. 5 the lamp 35 at the station C is normally connected with a source of direct current 41 over a resistance 40. The potential thus applied is insufficient, however, to make the lamp 35 strike which will happen only when the secondary winding of the output transformer 36 is connected with a station engaged in a conversation, whereupon the alternating current superimposed on the normally applied direct current will cause the lighting of the lamp 35.

It will be clear from the foregoing that although each station is provided only with a single indicating lamp, a busy signal will be given at a calling station when connection is attempted to any busy called station. In the design of any particular new equipment it will be a matter of choice as to which one of the circuit arrangements shown herein is used for applying speech signals to flash the neon lamp. However, in adding busy signalling facilities to an existing intercommunicating system it probably will be preferable to use one of the circuits of Figs. 3, 4 or 5 because the turns ratio of its transformer may reduce the speech signals below the lamps ignition potential.

What is claimed is:

1. In an intercommunicating system, a plurality of stations; at a first station an amplifier, a signal device and a station selector switch connected in respective circuits to the output of said amplifier, means including said station selector switch for connecting one station to another, a circuit connecting said signal device to a second station, means at the second station for supplying power to the signal device at the first station when the second station is issuing a signal to a third station and the first station is trying to call said second station.

2. In an intercommunicating system, a plurality of stations electrically connected to each other, at each station an amplifier, a signal device connected to the output of each amplifier, switching means at each station for connecting it with any other station, a circuit connecting each signal from one station with the output of the amplifier of another station, means including an amplifier at a called station for supplying power to the signal device of a calling station when said calling station attempts to connect a called station that is already interconnected.

3. The system according to claim 2, and in which at each station the amplifier has an output transformer, and the signal is connected with one winding of the transformer.

4. In an intercommunicating system, a plurality of stations, associated at each of said stations means including a line connecting it with the other stations, a loud speaker, an amplifier, input and output transformers, means for connecting said transformers to the amplifier, a talk-listen switch, means for connecting said switch to said loudspeaker, a circuit including a selector switch for connecting two stations together, means including said talk-listen switch for connecting the loudspeaker to the line of a station when said switch is in the normal or listen position and for connecting the associated loudspeaker with the input transformer when said switch is in the talk position, the output transformer being connected to said line, and a signal device at each station connected in a circuit with the respective output transformer thereof, whereby the issuance of a signal at a first station will energize the signal device at the first station in synchronism therewith indicating that a signal is going out over the line and means whereby power from the amplifier of a called station is supplied to the signal device of a calling station when said called station is issuing a signal to another of said stations.

5. The system according to claim 4, and in which the signal device is bridged across the primary winding of the associated output transformer.

6. A system according to claim 4, further comprising a step-up transformer connected across the secondary winding of said output transformer, said signal device being bridged across the secondary winding of said step-up transformer.

7. An intercommunicating system according to claim 4, and in which each output transformer has two secondary windings and the signal device is bridged across one of the associated secondary windings.

8. An intercommunicating system according to claim 4, and in which the signal device is bridged across the primary winding of the associated output transformer, and a source of direct potential permanently applied to the signal device.

ARTHUR S. KESTER.
BERNARD S. CAHILL.

REFERENCES CITED

The following references are of record in the file of this patent:

UNITED STATES PATENTS

| Number | Name | Date |
|---|---|---|
| 1,272,641 | Egerton | July 16, 1918 |
| 1,960,883 | Wallace | May 29, 1934 |
| 2,269,141 | Campbell | Jan. 6, 1942 |
| 2,269,142 | Campbell | Jan. 6, 1942 |
| 2,385,515 | Herrick | Sept. 25, 1945 |